United States Patent [19]
Reed

[11] Patent Number: 5,921,336
[45] Date of Patent: Jul. 13, 1999

[54] WALKING SUBSTRUCTURE DEVICE

[75] Inventor: Lowell M. Reed, Moore, Okla.

[73] Assignee: Parker Drilling Company, Tulsa, Okla.

[21] Appl. No.: 08/931,501

[22] Filed: Sep. 16, 1997

[51] Int. Cl.[6] .................................................. B62D 57/02
[52] U.S. Cl. .............................. 180/8.1; 180/8.5; 180/8.6
[58] Field of Search ......................... 180/8.1, 8.5, 8.6

[56] References Cited

U.S. PATENT DOCUMENTS

| | | | |
|---|---|---|---|
| Re. 29,541 | 2/1978 | Russell | 175/52 |
| 3,255,836 | 6/1966 | Hoppmann et al. | 180/8.6 |
| 3,576,225 | 4/1971 | Chambers | 180/8.5 |
| 3,612,201 | 10/1971 | Smith | 180/8 |
| 3,680,321 | 8/1972 | Bordes | 61/46.5 |
| 3,693,363 | 9/1972 | Van den Kroonenberg | 61/46.5 |
| 3,754,790 | 8/1973 | Mappin et al. | 180/8.5 |
| 3,769,802 | 11/1973 | Wefer | 61/46.5 |
| 3,796,276 | 3/1974 | Maeda | 180/8.5 |
| 3,828,689 | 8/1974 | Raffenberg | 104/273 |
| 4,014,266 | 3/1977 | Naslund et al. | 104/162 |
| 4,014,399 | 3/1977 | Ruder | 180/8.5 |
| 4,033,056 | 7/1977 | Demmers | 37/73 |
| 4,212,450 | 7/1980 | Lambert | 254/108 |
| 4,674,949 | 6/1987 | Kroczynski | 180/8.5 |
| 4,823,870 | 4/1989 | Sorokan | 166/79 |
| 5,032,040 | 7/1991 | Ingle | 405/201 |
| 5,453,931 | 9/1995 | Watts | 180/8.5 |
| 5,492,436 | 2/1996 | Suksumake | 405/201 |
| 5,496,013 | 3/1996 | Lussier | 254/105 |

*Primary Examiner*—Lanna Mai
*Assistant Examiner*—Michael Cuff
*Attorney, Agent, or Firm*—Head, Johnson & Kachigian

[57] ABSTRACT

A walking substructure device having a drilling rig substructure. A plurality of lifting jacks is provided, each lifting jack having an upper end and a lower end, the upper end connected to the drilling rig substructure. A plurality of roller assemblies is provided, each roller assembly connected to the lower end of one of the jacks, each roller assembly pivotal radially about an axis of the lifting jack. A plurality of jack pads is provided, with each jack pad having a center beam wherein one of the roller assemblies engages the center beam and rolls thereon. A push-pull mechanism extends between each jack pad and each roller assembly in order to move the shoe assemblies in relation to the drilling substructure.

15 Claims, 12 Drawing Sheets

WALKING SUBSTRUCTURE DEVICE

BACKGROUND OF THE INVENTION

1. Field of the Invention

The present invention is directed to a walking substructure device and a process for moving heavy equipment without dismantling the structure. In particular, the present invention is directed to a walking substructure device and process wherein an entire drilling rig can be moved in any direction without dismantling the drilling structure.

2. Prior Art

It is not uncommon at a drilling site to have multiple drill bores. This is done because of the expense of the drilling rig and its operation and to facilitate servicing of completed wells. It is often desirable to move a large drilling rig, including all of its equipment, from one well bore to another. In the past, it has been necessary to disassemble or "rig down" the drilling structure which required laying down the mast, moving the drilling structure to an alternate well bore, and then reassembling the drilling structure.

An additional problem is that the rig can not move down the row of well bores since the rig straddles the well bore and would have to move over an existing well head, sometimes 12 to 15 feet high. One solution in the past has been to raise the entire drilling structure ten to fifteen feet from ground level and move the drill structure over an existing well head. Also in the past, systems have been established where a series of parallel skids are placed between adjacent wells in order to slide the drilling structure from one well head to another. All of these past solutions have been time consuming and labor intensive.

It would be advantageous to provide a device and a process to move heavy equipment on land so that an entire drilling structure might be moved.

It would also be advantageous to provide a walking substructure device for moving heavy equipment that would move a drilling rig in any horizontal direction without dismantling.

It would additionally be advantageous to provide a walking substructure device for moving heavy equipment that would move a drilling rig in a rotational direction without dismantling.

It would also be advantageous to provide a walking substructure device which includes mechanisms in the substructure to move the entire drilling rig.

It would also be advantageous to provide a walking substructure device that is capable of incrementally displacing the entire drilling rig.

It would also be advantageous to provide a walking substructure device that may be installed and utilized with existing rig substructures.

SUMMARY OF THE INVENTION

The present invention is directed to a walking substructure device as well as a process to move a substructure including an accompanying drilling rig or other heavy equipment.

The substructure includes four jack pads which are connected to the substructure, each jack pad rotating about an axis. Each of the jack pads is freely rotatable when raised above ground level.

The jack pads may be rotated in order to move the substructure and accompanying drilling rig at any desired radial angle. The process operates to move the substructure by incrementally displacing the substructure.

Each jack pad is initially placed in a chosen radial orientation. Each jack pad contains a single cylindrical lifting jack. The hydraulic lifting jack is perpendicular to the elongated substructure and extends therefrom. The lifting jack includes an upper end attached to the substructure and a lower end connected to a roller assembly. Each roller assembly comprises a plurality of individual rollers on an endless chain. The roller assembly engages with and rolls on a center beam on the jack pad.

In the process of moving the substructure, thereafter, each lifting cylinder is extended. The lower end of the lifting cylinder moves toward ground level forcing the jacking pad against the ground. Once the jack pad has moved as far as possible, continued extension of the lifting cylinder causes the upper end of the lifting cylinder to move away from the lower end, causing the entire substructure and accompanying drilling rig to move from ground level. Ultimately, the substructure is lifted from ground level and suspended by the four jack pads.

In the next sequential step, the lifting jacks of each of the jack pads remain static in the extended position. A pair of push-pull mechanisms in the form of hydraulic cylinders extend between each jack pad and a jack shoe. The jack shoe contains an axially aligned convex surface that will mate with a concave surface from the lower end of the lifting cylinder. Extension of each push-pull hydraulic cylinder causes each jack pad to remain stationary while the entire substructure moves or shifts. The amount of extension of the push-pull cylinders indicates the amount of travel of the substructure.

In the next sequential step, each lifting jack is retracted so that the lower end will be brought toward the upper end. As a result, the substructure will return toward the ground and the jack pad will be raised off of the ground. During this step, the push-pull cylinders remain in the static, extended position.

Finally, in the last sequential step, the substructure rests on the ground while each jack pad moves by retraction of the hydraulic push-pull cylinders. Thereafter, the same sequential process is repeated again to incrementally displace the substructure.

DETAILED DESCRIPTION OF THE PREFERRED EMBODIMENTS

Figure 1:
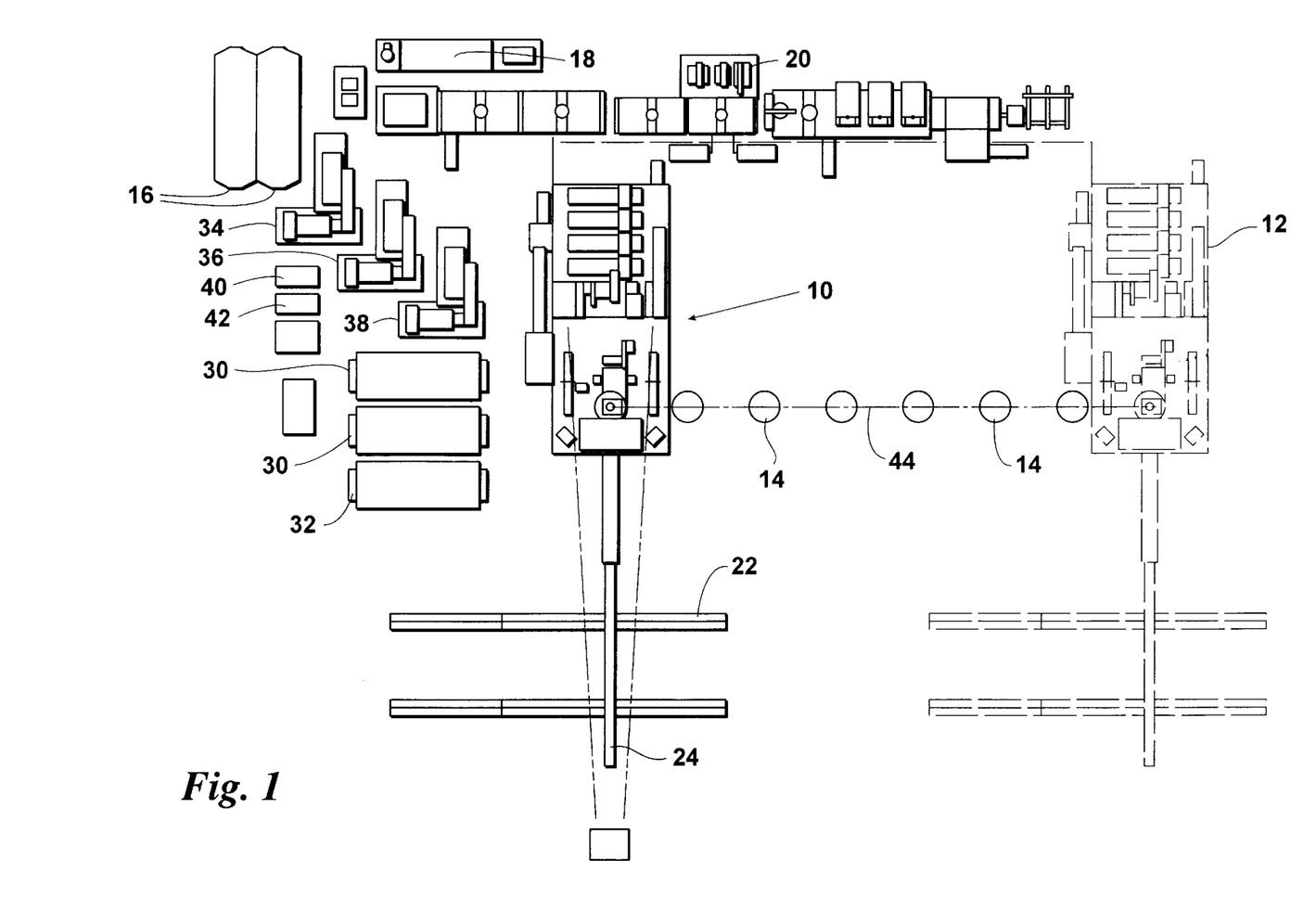
FIG. 1 illustrates a top view of a typical well drilling site having a drilling rig equipped with a walking substructure device of the present invention.

Referring to the drawings in detail, FIG. 1 shows a top view of a typical well drilling site wherein a drilling rig 10 has been equipped with a walking substructure device of the present invention, as will be described herein. From time to time, it will be necessary to move the drilling rig from one well bore to another. The dashed lines 12 indicate an alternate position for the drilling rig 10. The site in FIG. 1 includes eight well bores 14, approximately seven (7) meters apart. It will be understood that a greater or lesser number of well bores might be found in actual practice.

The drilling site may be configured in various ways and may include equipment to store drilling mud 16 which is used as a lubricant in the well bore during the drilling process. Drilling mud components may be mixed at tank 18. The mud after use is filtered at equipment 20. Sections of drill pipe would be stored at 22. The mast 24 rises from the floor of the drilling rig but is shown in the laid down position in FIG. 1. The drilling site may also include water tanks 30 and fuel tank 32.

Various pumping systems 34, 36 and 38 are used to move the drilling mud into the well bore, return the used drilling mud for storage and ultimate reuse. The pumping systems may be powered by generators 40 and 42.

Various other configurations of the well drilling site are, of course, possible within the parameters of the present invention.

It will often times not be possible to move the wellhead along the dashed line 44 since each well bore 14 may include equipment 12–15 feet from ground level.

Figure 2:
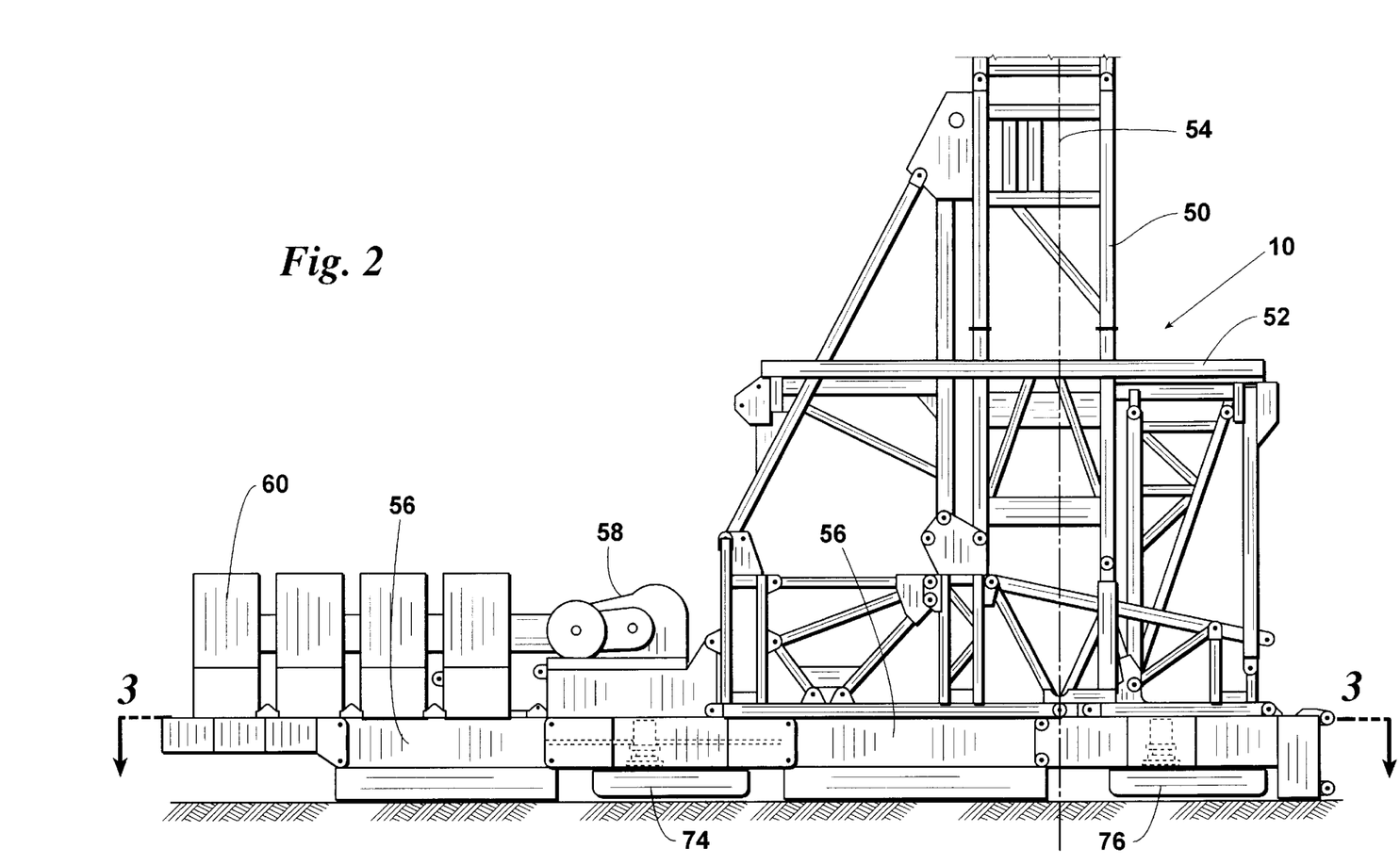
FIG. 2 illustrates a side, partial view of the drilling rig shown in FIG. 1.

FIG. 2 illustrates a side, partial view of the drilling rig 10 shown in FIG. 1. The drilling rig 10 includes an upstanding mast 50 which is connected to a floor 52 of the drilling rig. The mast 50 may extend 40 to 50 meters. The dashed line 54 indicates the location of the well bore 14 over which the drilling rig is sitting. The mast 50 and floor 52 are above and connected to an elongated drilling rig substructure 56. The drilling rig substructure 56 rests on the ground at ground level or, alternately, may rest on mats on the ground. It will be appreciated that the substructure 56 carries the entire weight of the drilling rig.

The drilling rig 10 also includes various draw works 58 and engine components 60. The drilling rig 10 as shown is well known in the art and further detailed description is not deemed necessary.

Figure 3:
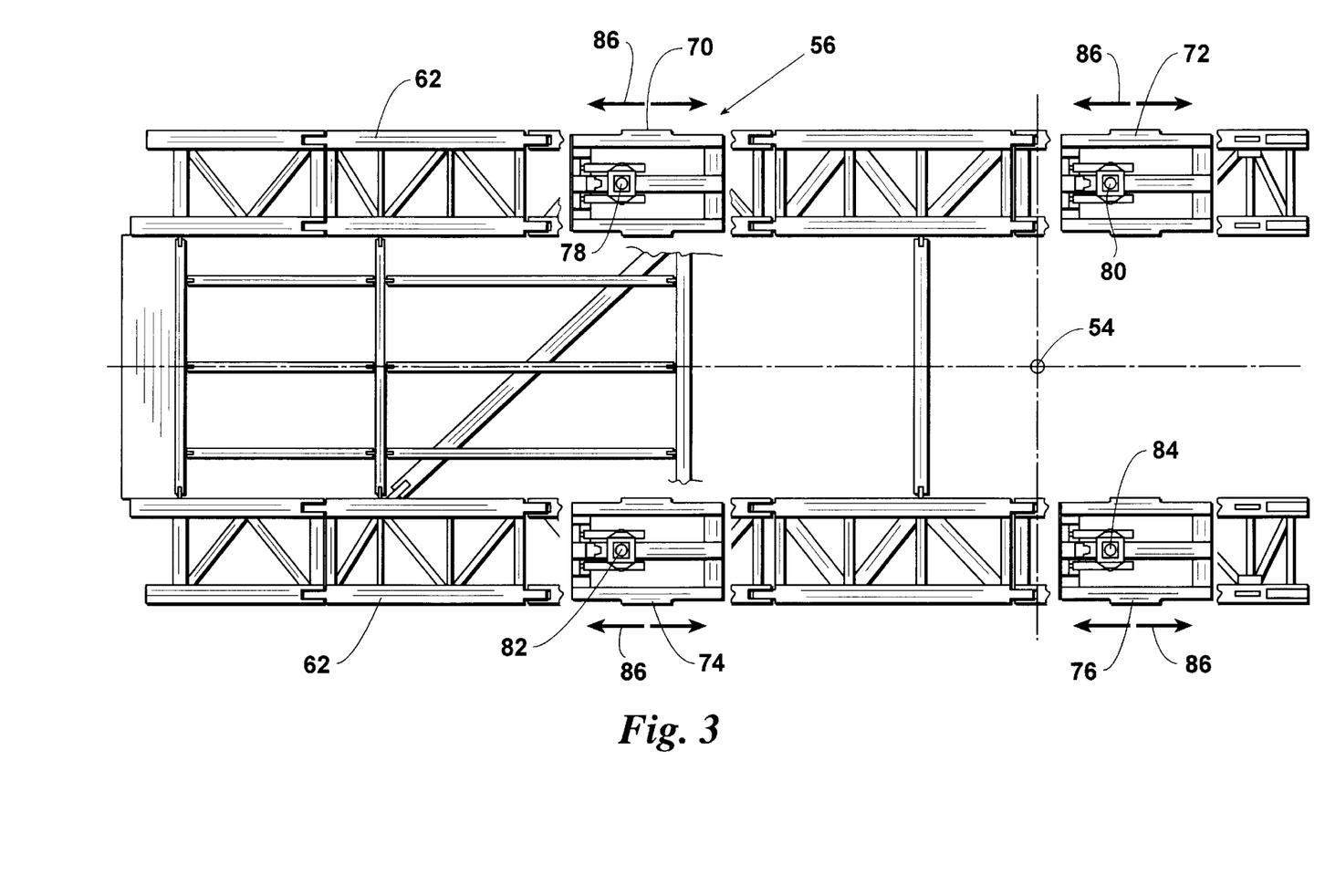
FIG. 3 is a sectional view taken along section line 3—3 of FIG. 2.

FIG. 3 is a sectional view taken along section line 3—3 of FIG. 2 showing the substructure 56 of the drilling rig 10. Substructure 56 surrounds and straddles the well bore 54, at the intersection of dashed lines.

The substructure 56 includes a plurality of beams and girders 62 joined together, which have been partially cutaway in FIG. 3 to reveal four jack pads 70, 72, 74 and 76, connected to the substructure. Each jack pad 70, 72, 74 and 76 will rotate about an axis 78, 80, 82 and 84, respectively.

Two of the jack pads 74 and 76 are visible in FIG. 2. Each of the jack pads are rotatable when raised above ground level, as seen in FIG. 2.

Figure 3A:
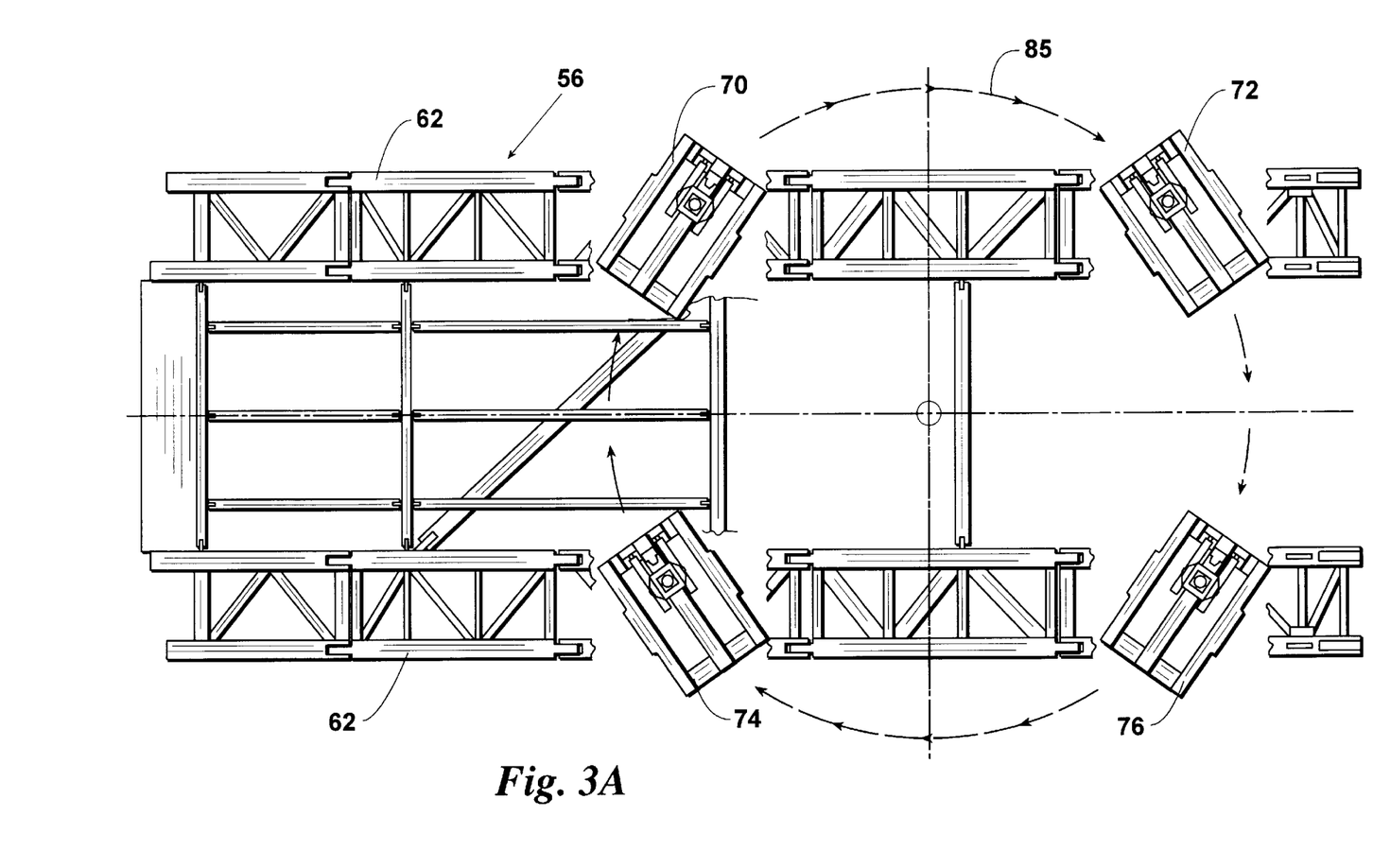
FIGS. 3A, 4, 5 and 6 illustrate alternate radial movements of the drilling substructure possible with the present invention.

Returning to a consideration of FIG. 3, arrows 86 show two possible movements of the substructure 56 with relation to the jack pads. This directional movement in FIG. 3 is either front or backwards. Rotationally, this will be described as zero degrees (0°). FIG. 3A illustrates an alternate movement of the substructure wherein each of the jack pads is placed in a different angular position. This will cause the entire substructure to rotate as illustrated by arrows 85.

Figure 4:
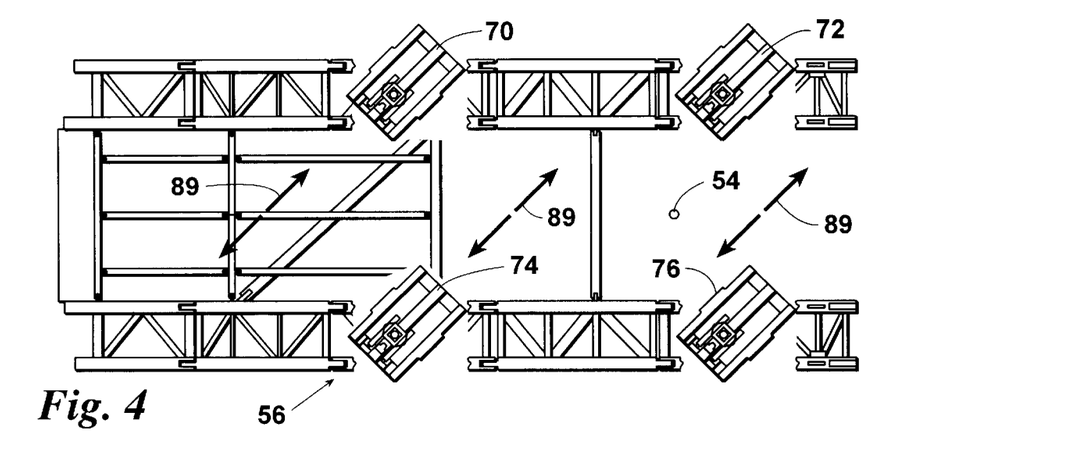
Figure 5:
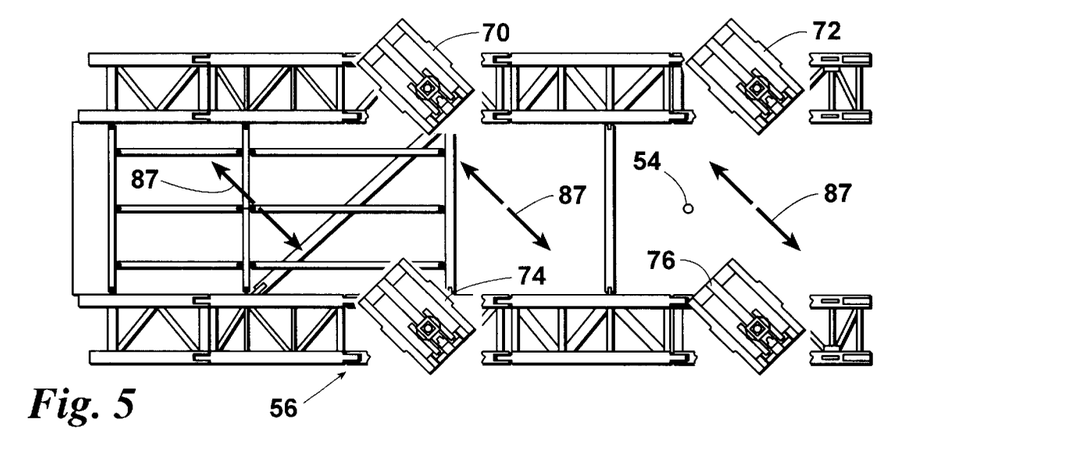
Figure 6:
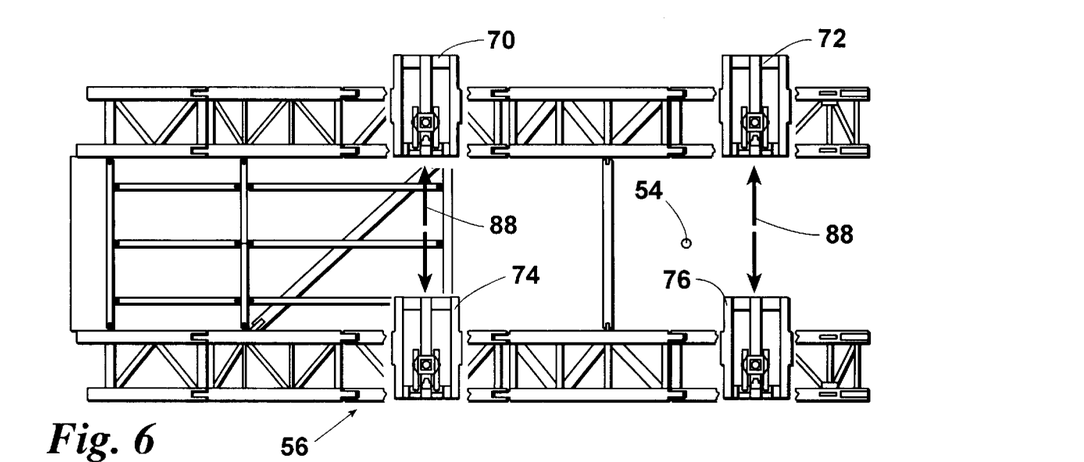

FIGS. 4, 5 and 6 illustrate various alternate radial movements for the drilling substructure.

FIG. 5 shows the jack pads 70, 72, 74 and 76 positioned to move the substructure 56 at a 45° radial angle. Arrows 87 indicate the possible directions of movement. FIG. 6 shows the jack pads set to move at a 90° angle, that is either left or right. Arrows 88 indicate the possible directions of movement.

Finally, FIG. 4 shows the jack pads 70, 72, 74 and 76 set to move at a 315° angle. Arrows 89 indicate the possible directions of movement.

From the foregoing, it can be appreciated that although FIGS. 3, 4, 5 and 6 show four radial positions, the present invention may be utilized to move the substructure 56 and accompanying drilling rig 10 at any desired radial angle. Additionally, the position in FIG. 3A will permit the substructure to rotate.

FIGS. 7, 8, 9, 10 and 11 are side views illustrating the sequential process to move or walk the rig substructure 56. A portion of the drilling substructure 56 is illustrated by dashed lines. An open area at the base of the substructure is defined. As will be described, the process operates by incrementally displacing the substructure 56. The process will be described in relation to jack pad 70 with the understanding that the other jack pads function identically.

Initially, the jack pad 70 is put in a chosen radial orientation, such as previously described in FIGS. 3, 4, 5 and 6. Each of the other jack pads (not visible) will be manually moved about its axis to the same radial orientation. This step has been accomplished prior to the steps to be described in FIGS. 7, 8, 9, 10 and 11.

Figure 7:
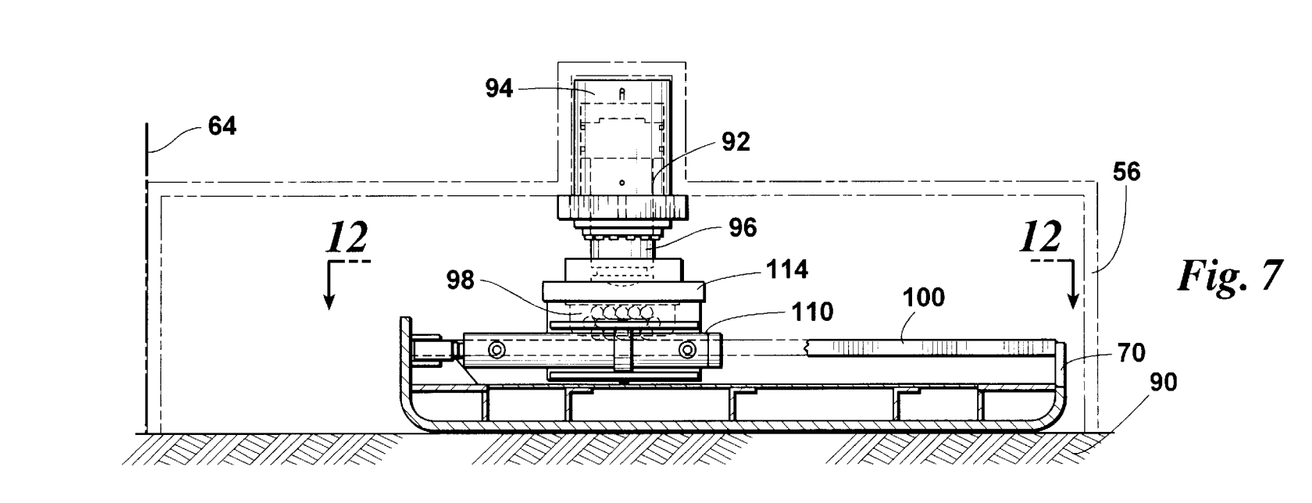
FIGS. 7, 8, 9, 10 and 11 are side views illustrating the sequential process to move or walk the substructure in accordance with the present invention.

Reference line 64 will be used in order to gauge the displacement of the substructure. During operation of the drilling rig 10, the jack pad 70 may be slightly raised above ground level 90 or, as seen in FIG. 7, the jack pad 70 may rest on the ground 90 and be used as a load sharing structure along with the substructure 56.

A hydraulic lifting jack 92 is perpendicular to the elongated substructure 56 and extends therefrom. In the present embodiment, a two hundred to four hundred (200 to 400) ton hydraulic cylinder is employed. The lifting jack 92 is substantially cylindrical so that the axis of lifting jack 92 is parallel to the axis of each other lifting jack. The lifting jack 92 includes an upper end 94 attached to the substructure 56 and a lower end 96 connected to a roller assembly 98, in a manner to be described. The roller assembly 98 engages with and rolls on a center beam 100 on the jack pad. The center beam 100 is generally perpendicular to the lifting cylinder 92.

Each of the other jack pads 72, 74 and 76 (not shown) are configured and operate in a similar manner. Indeed, a single hydraulic pump driven by a single electric motor will power each jack pad.

Figure 8:
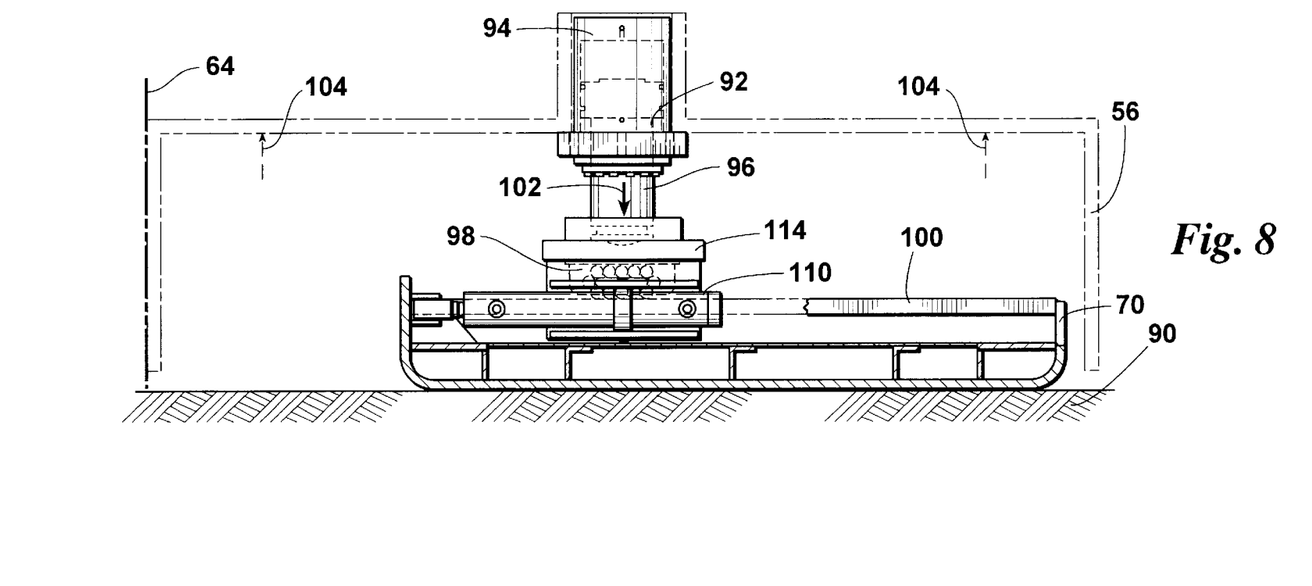

FIG. 8 illustrates the next sequential step in the process to move or walk the substructure. The lifting cylinder or lifting jack 92 is extended, as well as the other lifting jacks.

The lower end 96 of the lifting cylinder 92 moves toward ground level 90 forcing the jack pad 70 against the ground. Once the jack pad 70 has moved and rests on the ground, continued extension (see arrow 102) will cause the upper end 94 of the lifting cylinder 92 to move in the opposite direction. This will cause the entire substructure 56 to move away from ground level 90 as illustrated by arrows 104.

As seen in FIG. 8, the result is that the substructure 56 has been lifted away from ground level 90 and is suspended by the four jack pads 70, 72, 74 and 76.

Figures 9, 10:
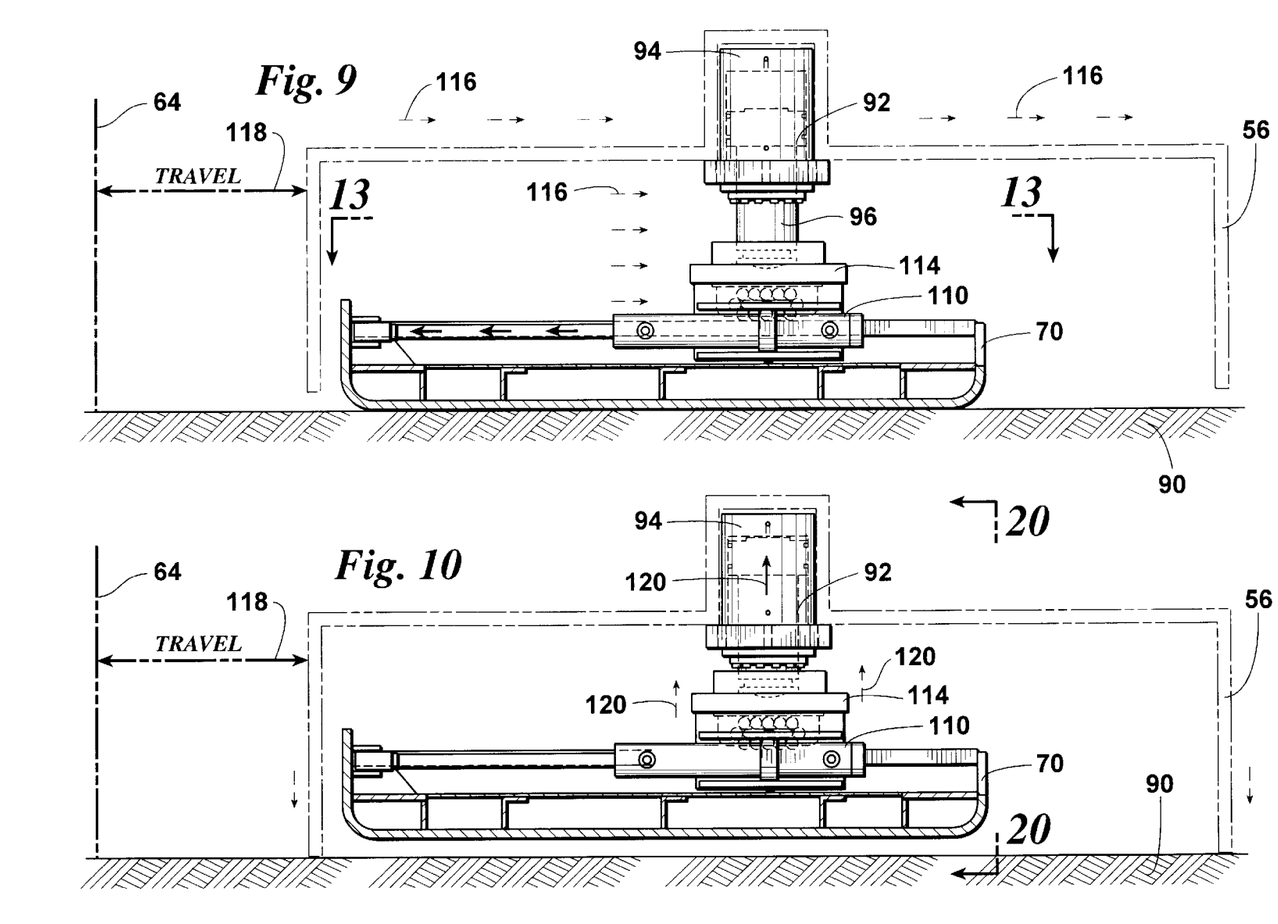

FIG. 9 illustrates the next sequential step in the process to move or walk the substructure. The lifting jacks 92 of each of the jack pads 70, 72, 74 and 76 will remain static in the extended position so that the substructure 56 is raised above ground level. A pair of push-pull mechanisms, in the form of hydraulic cylinders 110 and 112 (only cylinder 110 visible in FIG. 9), will then be extended. The hydraulic cylinders 110 and 112 extend between the jack pad 70 and a jack shoe 114 which contains the roller assembly.

The hydraulic cylinders are in the retracted position in FIGS. 7 and 8. In the present embodiment, cylinders having a three foot stroke are employed.

Recall that each of the jack pads is firmly planted on the ground. Extension of each push-pull hydraulic cylinders 110 and 112 causes each jack pad to remain stationary against the ground 90 while the entire substructure 56 moves or shifts in the direction shown by arrows 116. The roller assembly 98 moves on the center beam of the jack pad. The amount of extension of the push-pull cylinders 110 and 112 will indicate the amount of travel of the substructure, as illustrated by arrow 118. This represents the amount of incremental displacement of the substructure 56.

FIG. 10 illustrates the next sequential step in the process to move or walk the substructure 56.

The lifting jack 92 will be retracted so that the lower end 96 will be brought toward the upper end 94. The direction of movement of the lower end 96 is illustrated by arrow 120. As a result, the jack pad 70 will move off of the ground 90. At the same time, the substructure 56 will move toward the ground 90. During this step, the hydraulic cylinders 110 and 112 will remain in a static, extended position.

Each of the other lifting jacks will operate in the same manner at the same time.

Figure 11:
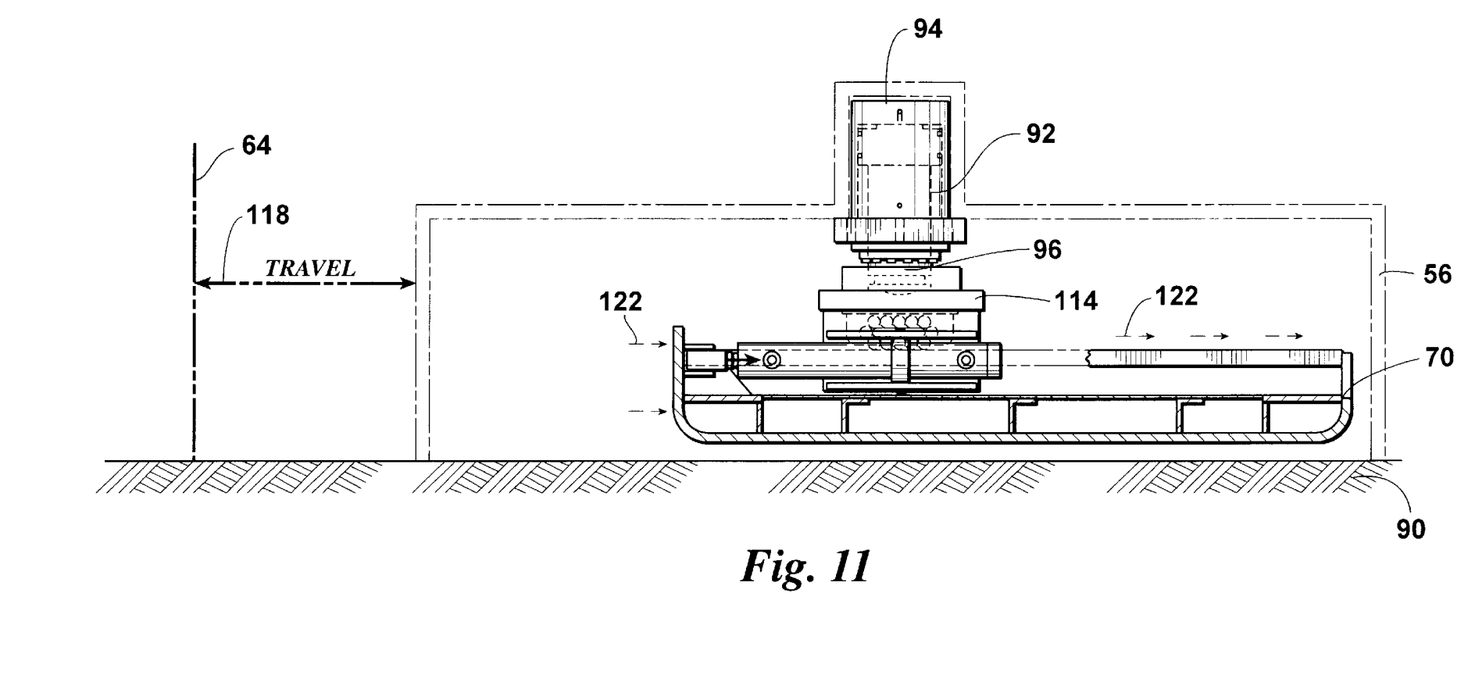

Finally, FIG. 11 represents the last sequential step in the process to walk or move the substructure. The substructure now rests on the ground. With the jack pad 70 lifted off the ground 90, the hydraulic cylinders 110 and 112 are retracted, forcing the jack pad 70 in a direction shown by arrows 122. The jack pad is thereby returned to the initial position. Thereafter, the same sequential process will be repeated to incrementally displace the substructure 56 and move it.

The drilling rig will not have to be dismantled to utilize the process of the present invention.

Figure 12:
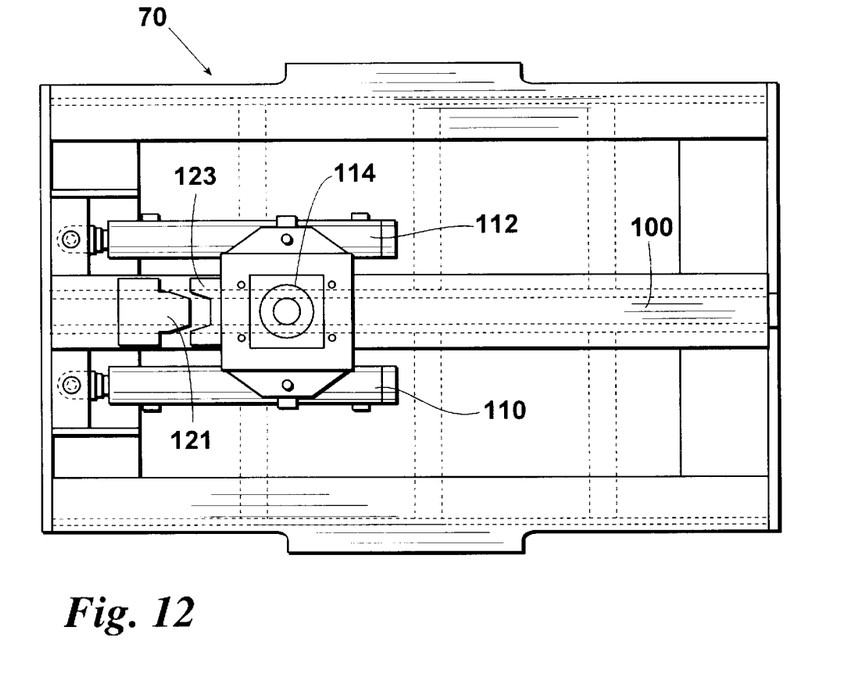
FIG. 12 is a sectional view taken along section line 12—12 of FIG. 7.

FIG. 12 shows a sectional view taken along section line 12—12 of FIG. 7. The jack shoe 114 is visible from the top. The lifting jack 92 is above the center beam 100 of the jack pad. Both of the push-pull hydraulic cylinders 110 and 112 are retracted. Each center beam includes a male V-shaped alignment plate 121 that mates with a female V-shaped alignment plate 123 extending from the jack shoe 114. When the plates are engaged, the jack pad will be aligned with the roller assembly.

Figure 13:
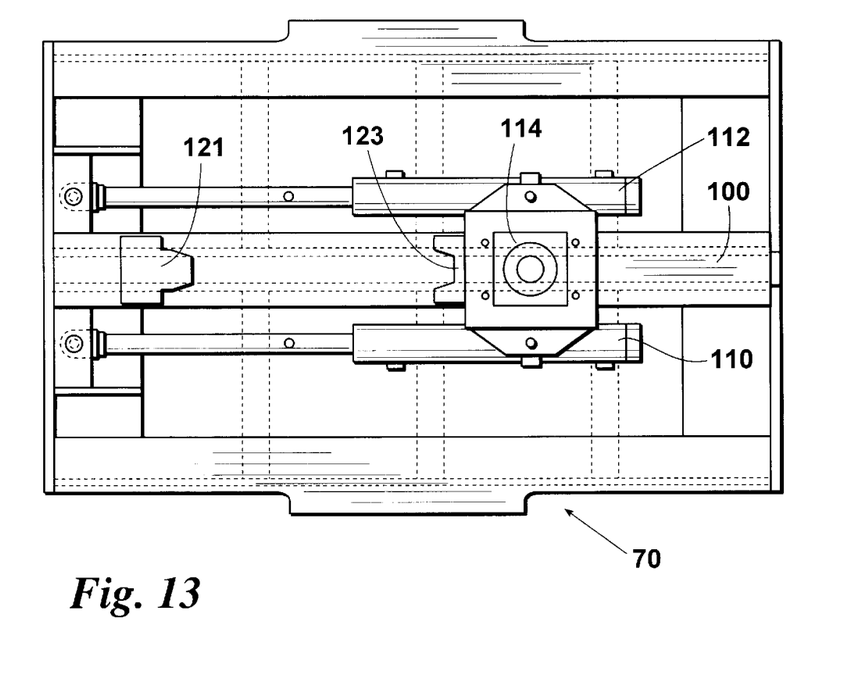
FIG. 13 is a sectional view taken along section line 13—13 of FIG. 9.
Figure 14:
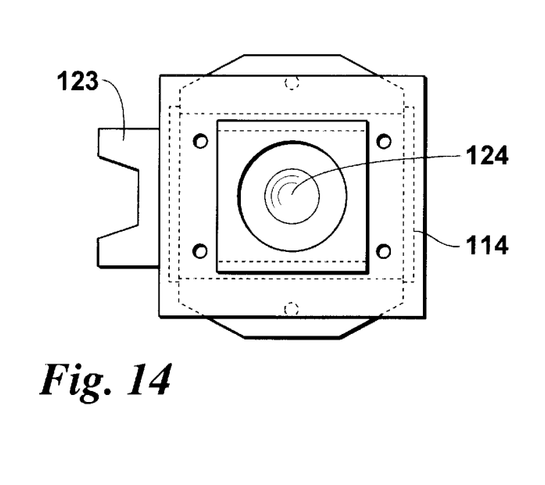
FIGS. 14 through 17 illustrate a jack shoe of the present invention.

FIG. 13 shows a sectional view taken along section line 13—13 of FIG. 9. Both of the push-pull hydraulic cylinders 110 and 112 have been extended.

FIGS. 14, 15, 16 and 17 illustrate the jack shoe 114 which connects to the push-pull hydraulic cylinders 110 and 112. The jack shoe 114 contains an axially aligned convex surface 124 that will mate with a concave surface on the lower end of lifting cylinder 92 (not seen in FIGS. 14, 15 16 and 17). The mating of these surfaces will help accommodate any uneven ground terrain encountered.

Figures 15, 16:
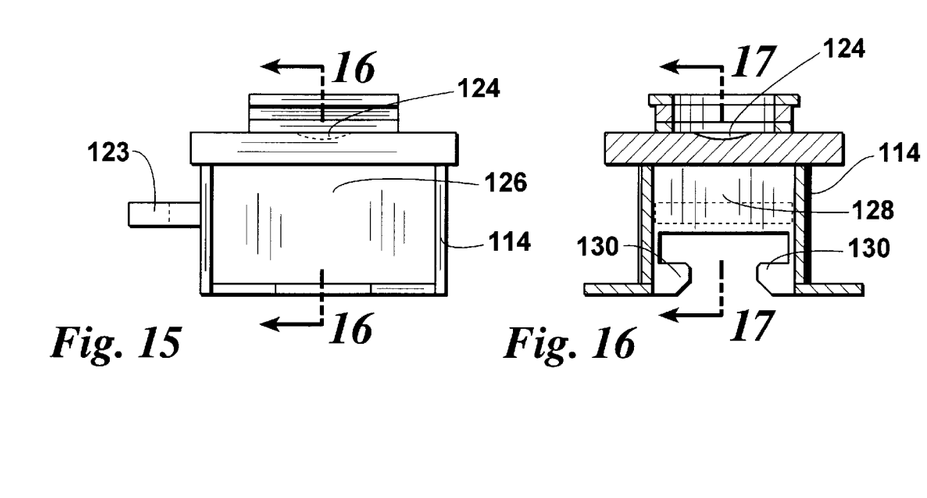
Figure 17:
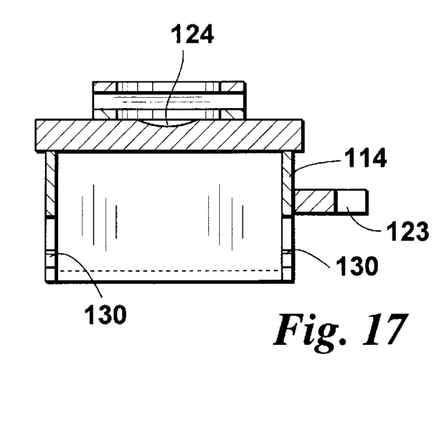

As seen in FIG. 15, the jack shoe 114 has an interior area 126 that forms a container for the roller assembly 98. FIG. 16 illustrates a sectional view taken along section line 16—16 of FIG. 15. The jack shoe 114 contains a pair of opposed walls 128 having an opening with flanges 130. This opening with flanges 30 receives and surrounds the center beam. When the lifting cylinder is retracted, the jack shoe will be raised which serves to raise the center beam and the accompanying jack pad.

Figure 18:
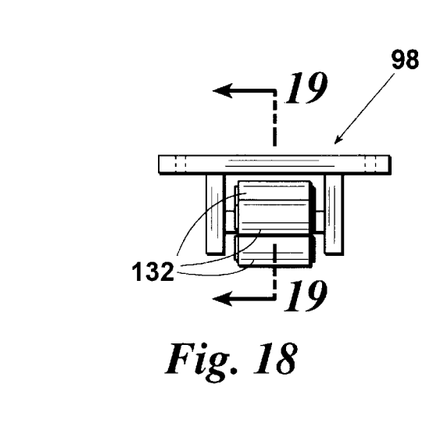
FIGS. 18 and 19 illustrate a roller assembly of the present invention.
Figure 19:
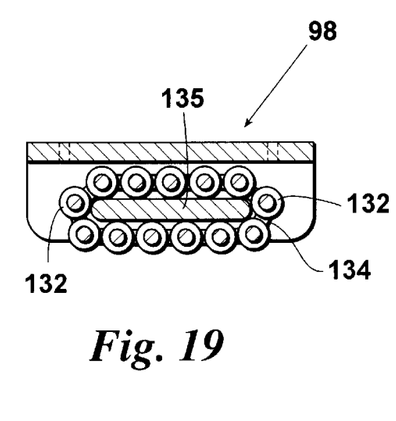

FIGS. 18 and 19 show the roller assembly 98 which comprises a plurality of individual rollers 132 on an endless chain 134. The rollers revolve around a central plate 135. The rollers move on the center beam 100. One suitable type of roller assembly is manufactured by Hillman Rollers™.

Figure 20:
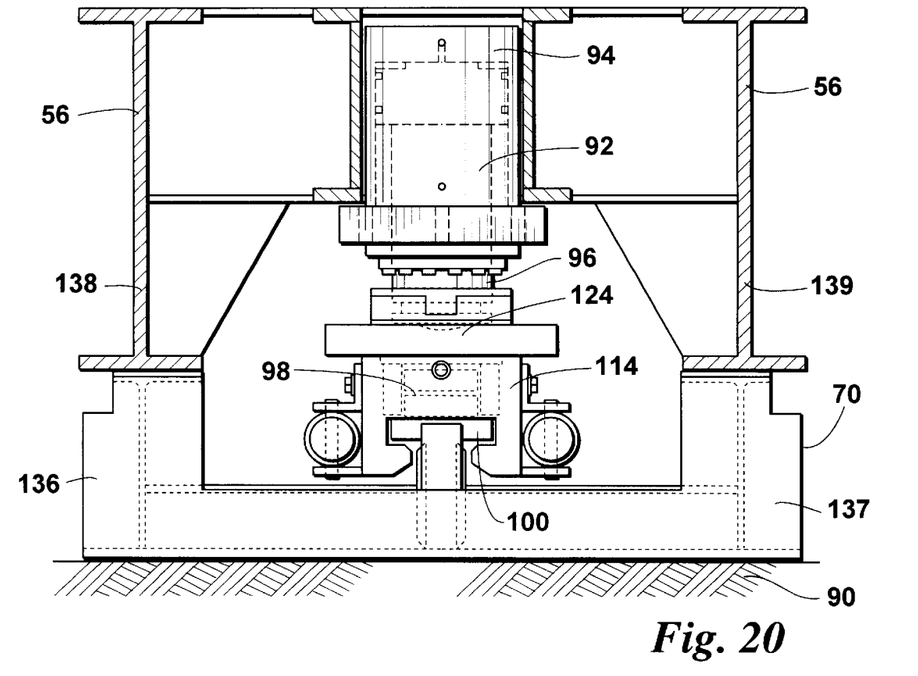
FIG. 20 illustrates a lifting jack and jack pad with the substructure partially cut-away for visibility.

FIG. 20 illustrates a partial sectional view showing the lifting mechanism and push-pull mechanism in conjunction with the substructure 56.

When the lifting jack 92 is retracted, a pair of parallel support beams 136 and 137 extending from the jack pad 70 engages a pair of skid beams 138 and 139 extending from the substructure. The center beam 100 is T-shaped, matching the openings in walls 128 of the jack shoe. Accordingly, the flanges 130 engage the center beam when the jack pad is raised.

Figure 21:
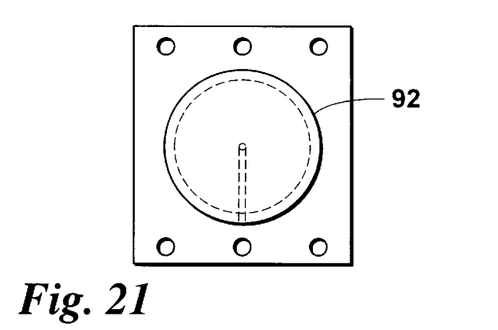
FIGS. 21, 22 and 23 illustrate the lifting jack of the present invention.
Figure 22:
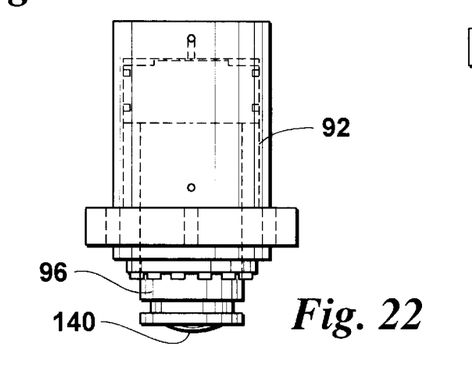
Figure 23:
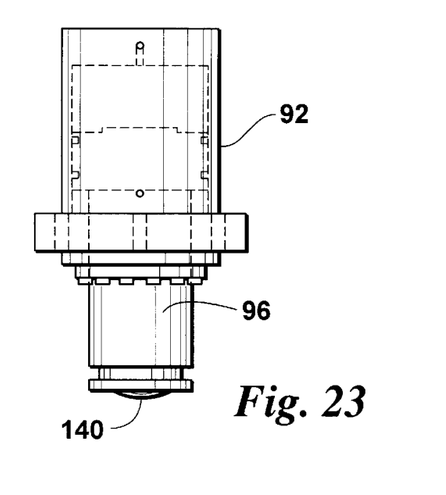

FIGS. 21, 22 and 23 illustrate the lifting cylinder 92 apart from the device. The concave surface 140 on the lower end of the cylinder is visible. The lower end 96 of the lifting cylinder 92 also includes a circular recess which mates with a retaining plate or plates on the top of the jack shoe 114, previously described. The jack shoe 114 will, thus, be supported and hang from the lower end of the lifting cylinder 92.

Figure 24:
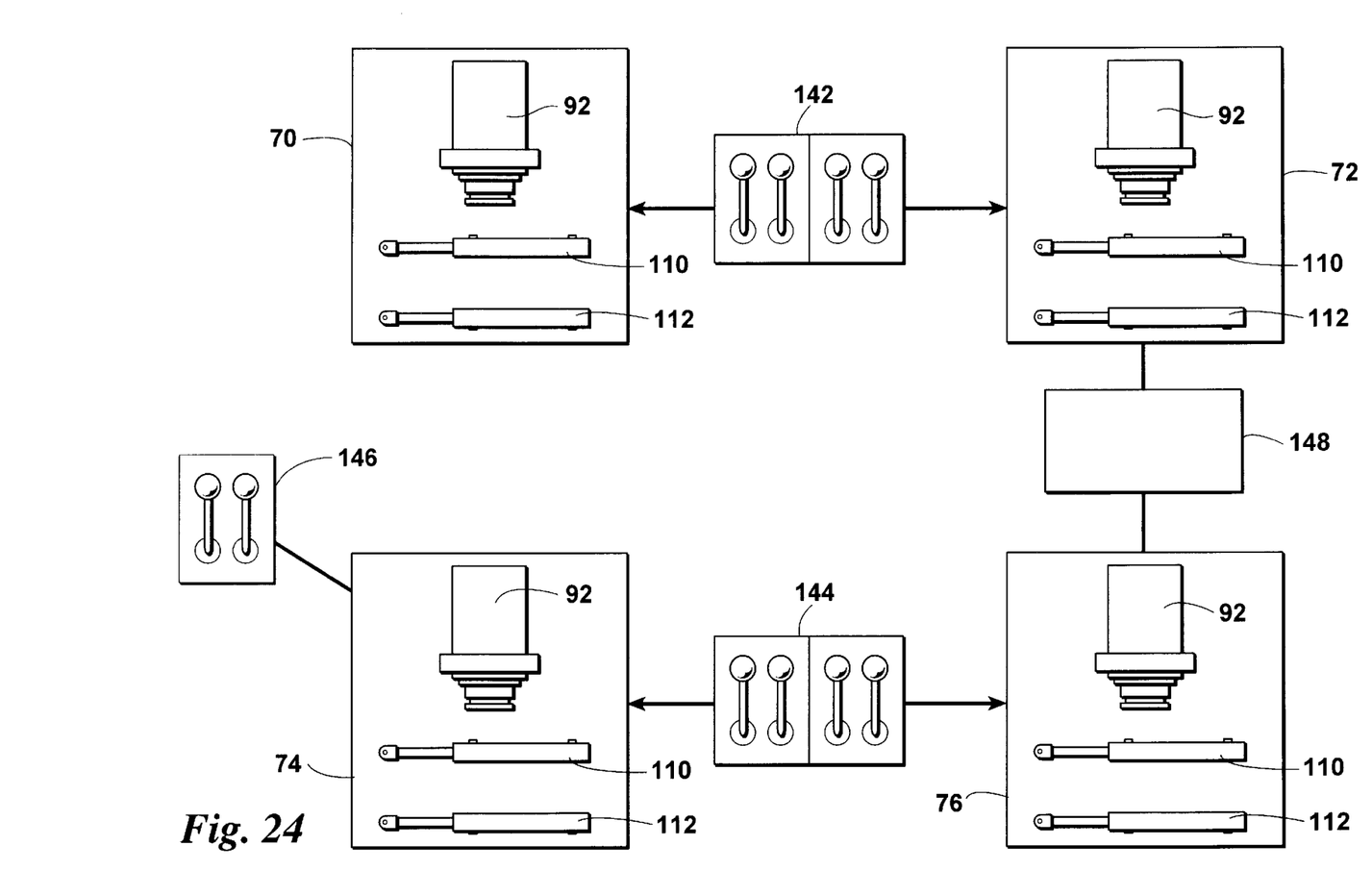
FIG. 24 illustrates a simplified, block diagram of a hydraulic layout of the present invention.

Finally, FIG. 24 is a simplified block diagram of the hydraulic system. Each of the jack pads 70, 72, 74 and 76 has a lifting cylinder 92 and a pair of push-pull cylinders 110 and 112 the operation of which has previously been described. Adjacent jack pads 70 and 72 communicate with a local, side operator control station 142 to operate the individual pads. Likewise, adjacent jack pads 74 and 76 communicate with a local, side operator control station 144 to operate the individual pads. Each of the jack pads communicate with a master control 146 and a power unit 148 containing a pair of pumps so that all of the jack pads may be operated from the master control station 146.

Whereas, the present invention has been described in relation to the drawings attached hereto, it should be understood that other and further modifications, apart from those shown or suggested herein, may be made within the spirit and scope of this invention.

What is claimed is:

1. A walking substructure device, which comprises:

a drilling rig substructure;

a plurality of lifting jacks, each said lifting jack having an upper end and a lower end, each said upper end connected to said drilling rig substructure;

a plurality of roller assemblies, one roller assembly connected to said lower end of each of said lifting jacks, each said roller assembly pivotal radially about an axis of said lifting jack;

a plurality of jack pads, each said jack pad having a center beam wherein one said roller assembly engages one of said beams and rolls thereupon each said jack pad rotatable radially with its corresponding roller assembly about said axis to any desired position of 360°; and a push-pull mechanism extending between each said jack pad and each said roller assembly to move the jack pad in relation to said drilling rig substructure.

2. A walking substructure device as set forth in claim 1 including four said lifting jacks, each said lifting jack being parallel to the others.

3. A walking substructure device as set forth in claim 1 wherein each said roller assembly includes a roller container that engages said center beam and contains a plurality of rollers therein.

4. A walking substructure device as set forth in claim 1 wherein each said roller assembly includes a jack shoe.

5. A walking substructure device as set forth in claim 4 wherein each said jack shoe includes an upper concave surface which mates with a convex surface on said lower end of each said lifting jack.

6. A walking substructure device as set forth in claim 4 wherein each said jack shoe is rotatable with respect to said lifting jack.

7. A walking substructure device as set forth in claim 6 wherein each lower end of said lifting jack includes a circular recess and each jack shoe includes a retaining plate that mates with said recess.

8. A walking substructure device as set forth in claim 4 wherein each said push-pull mechanism includes a pair of hydraulic cylinders, each said hydraulic cylinder extending between said jack pad and said jack shoe so that said jack pads move in increments.

9. A walking substructure device as set forth in claim 4 wherein each said jack pad centerbeam includes a male V-shaped alignment plate that mates with a female V-shaped alignment plate on said jack shoe.

10. A walking substructure device as set forth in claim 1 wherein each said jack pad includes a pair of parallel support beams that engage a pair of skid beams on said substructure.

11. A walking substructure device as set forth in claim 1 wherein each said jack pad with its corresponding roller assembly is positionable independently of each other jack pad.

12. A process to move a drilling rig substructure, which process comprises:

rotating a plurality of lifting jacks wherein each said lifting jack is rotated any desired radial orientation of 360° about an axis, each said lifting jack having an upper end connected to said drilling rig substructure and a lower end connected to a roller assembly;

extending said plurality of lifting jacks so that a jack pad connected to each roller assembly engages ground level;

raising said drilling rig substructure from said ground level by extending said plurality of lifting jacks;

moving said substructure in incremental amounts by moving said substructure with relation to said jack pads; and lowering said drilling rig substructure by retracting said plurality of lifting jacks.

13. A process to move a drilling rig substructure as set forth in claim 12 including four said lifting jacks.

14. A process to move a drilling rig substructure as set forth in claim 12 wherein each said lifting jack comprises a hydraulic cylinder.

15. A process to move a drilling rig substructure as set forth in claim 12 wherein said substructure is moved with relation to said jack pads by extending and retracting a pair of push-pull hydraulic cylinders.

\* \* \* \* \*